Dec. 17, 1929.  F. W. MÜLLER  1,740,197
SELF LUBRICATING BEARING
Filed March 27, 1928
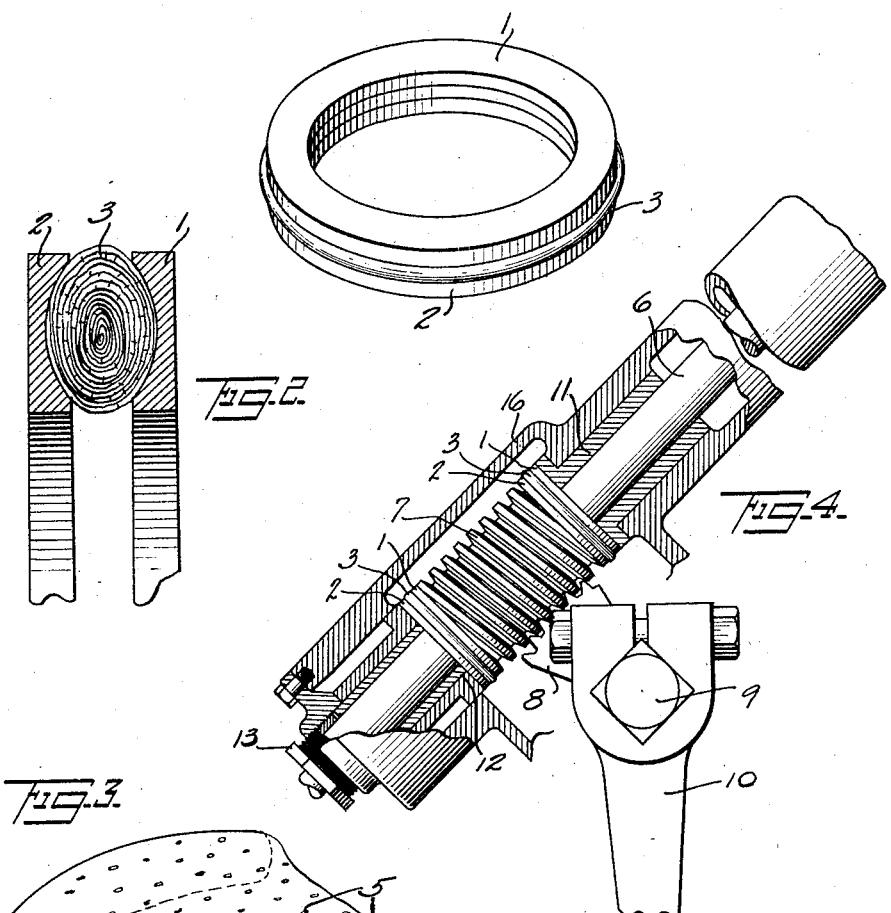
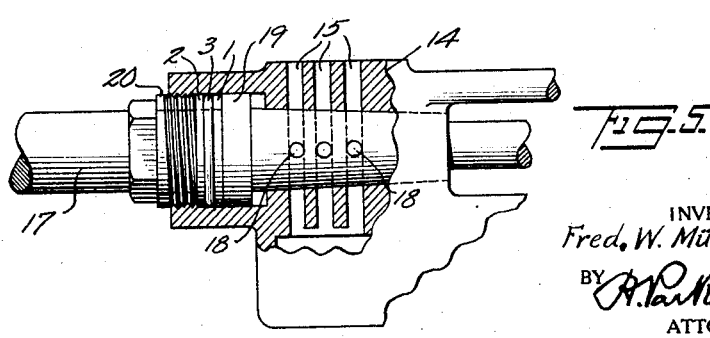
INVENTOR
Fred. W. Müller
BY
ATTORNEY Patented Dec. 17, 1929

1,740,197

UNITED STATES PATENT OFFICE.

FRED W. MÜLLER, OF HOBOKEN, NEW JERSEY, ASSIGNOR OF ONE-HALF TO CHARLES H. WHITENACK, OF SEA CLIFF, NEW YORK

SELF-LUBRICATING BEARING

Application filed March 27, 1928. Serial No. 265,138.

This invention relates to anti-friction bearings usable as a substitute for ball bearings but which will be self-lubricating and will not bind when tightened up to the degree necessary to practically eliminate all loose play of the parts.

To this end the invention comprises the substitution of a ring of slightly compressible and elastic material, such as canvas, faced or impregnated, or both faced and impregnated with a lubricant, preferably in dry, comminuted form, such as graphite, for the series of balls usually placed between the two opposing ball race members of a ball bearing.

The best form of apparatus at present known to me embodying my invention is illustrated in the accompanying sheet of drawings, in which Fig. 1 is a perspective view of one form of such bearing.

Fig. 2 is a detail cross section thereof on an enlarged scale.

Fig. 3 is a perspective view of a section of a sheet of textile material partly coiled on itself to form the anti-friction member of the bearing.

Fig. 4 is a view partly in section and with parts broken away showing the invention applied to the steering post of an automobile, and Fig. 5 is a similar view of a tapered plug valve with the invention applied as a take-up means therefor.

Throughout the drawings like reference characters indicate like parts. 1 and 2 are the usual oppositely grooved ball races of a standard ball bearing, and 3 is a ring of slightly compressible, slightly elastic material, such as canvas, capable of holding lubricating material, such as graphite, and confined between said ball races 1 and 2, in place of the usual series of hard steel balls.

Preferably ring 3 is formed by coiling a sheet of canvas 4, faced, or impregnated, or both faced and impregnated, with graphite finely comminuted, as indicated at 5, 5.

In using my invention it is installed in any particular mechanism in place of the usual ball bearing unit and subjected to the proper amount of pressure by existing take-up means, so as to eliminate loose play of the parts of the mechanism.

Thus in Fig. 4 a part of the steering mechanism of an automobile is shown having the steering post 6 carrying worm 7 in housing 16. The toothed sector 8 mounted on pivot 9 oscillates the steering arm 10 when the steering post and worm 7 are rotated. 11 is an upper bushing and 12 a lower bushing between which and either end of the worm 7 are confined the anti-friction devices composed of elements 1, 2 and 3 of my invention. 13 is a take-up thimble mounted in housing 16 and bearing on the lower end of lower bushing 12. When this thimble is screwed inward pressure is applied to compress the elastic rings 3, 3, to the proper extent, and a tight but well lubricated bearing for the steering post and worm is thereby obtained.

In Fig. 5 I have shown a tapered valve plug 17 with ports 18, 18, set in casing 14 provided with registering ports 15, 15. The plug 17 has a collar or flange 19 thereon against which a spring usually presses. In place of such spring I have substituted my elastic anti-friction bearing comprising elements 1, 2 and 3, as before, and the screw threaded thimble 20 mounted in casing 14 bears on this. As a result when thimble 20 is screwed inwardly to the proper extent the valve plug 17 is forced inwardly by a slightly yielding pressure applied to its collar 19, but may still be easily rotated, without jamming. Consequently the valve is always leak-proof and yet never sticks in its seat, requiring only a slight torsional force to open and close it.

When the bearings herein shown are used for any considerable length of time the graphite, or other lubricating material with which ring 3 is impregnated, tends to work out toward the surface to maintain efficient lubrication at that point, or, as the fabric wears down, the embedded graphite is uncovered and brought into action as a lubricant. As a result, no additional lubricant need be introduced.

The advantages of the invention comprise this continued self lubricating action which requires no attention from the user, the freedom from binding or chattering, to which the ordinary ball bearing is liable, and cheapness of construction. The ring 3 costs less than the balls for which it is substituted, and the grooves in the race members 1 and 2 need not be so carefully machined as when they are to be used with balls. When a ring 3 has been worn down in time, a new one can be substituted easily and at small expense.

While a circular cross section of ring 3 is preferred, other forms could be substituted. Other slightly compressible and slightly elastic materials also could be substituted for the roll of canvas shown, and other lubricants, such as talc for instance, might be used in place of graphite.

I am aware that rings of canvas impregnated with graphite have been used as piston-rod packing, but in that use the friction on the ring is along lines across the surface of the ring and applied to the point of tangency only so that it is much more destructive than is the case in my invention where the wearing movement is around the periphery of the ring in a circular path and the bearing surfaces nearly enclose and surround the ring, so that there is little opportunity for its deformation and disintegration from pressure or friction. Also I am aware that rings of metal have been thus used in anti-friction bearings, but being non-elastic they are liable to bind like ball bearings when adjusted too tightly, or to rattle when adjusted with the necessary looseness. Also they require the constant supply and renewal of a liquid or viscous lubricant, such as oil or grease, not being self-lubricating.

An important feature of my invention results from the fact that the slightly compressible body of lubricating material, preferably a graphite-impregnated ring of textile material, lies loosely in oppositely located grooves between the two main elements of the bearing formed of metal, or of other rigid material, and is thick enough to hold said grooved elements slightly apart under any pressure not considerably in excess of the predetermined normal amount. Thus friction of metal on metal is totally eliminated, that of metal on lubricating rings being substituted therefor, and, as the ring is free to move in either groove relatively to the grooved elements, motion will always occur between the ring and that one of the grooved elements which develops the least friction at any given moment, so that only the minimum amount of friction need be overcome at all times.

Having described my invention, I claim:

1. An anti-friction bearing comprising, in combination, a ring-shaped member having a continuous groove in one face, a ring of slightly compressible and elastic material, faced with a comminuted anti-friction material, lying loosely in said groove and capable of circular movement therein, and means for holding said elements in contact one with another under a regulated degree of pressure.

2. A combination such as defined in claim 1 in which said ring is formed of cloth.

3. A combination such as defined in claim 1 in which said ring is formed of cloth and the facing material is comminuted graphite.

4. A combination such as defined in claim 1 in which said ring is formed of a sheet of textile material faced with graphite and rolled upon itself in a spiral.

5. An anti-friction bearing structure capable of use in place of a ball bearing, which structure comprises, in combination, two corresponding, oppositely grooved ball races and a ring of slightly compressible and elastic material faced and impregnated with a lubricant and resting in the grooves in said races.

6. A structure such as defined in claim 5 in which said ring is formed of textile material in sheet form.

7. A structure such as defined in claim 5 in which said ring is formed of textile material in sheet form, said sheet being coiled upon itself in a spiral.

8. A structure such as defined in claim 5 in which said ring is formed of textile material in sheet form, and in which the lubricant is powdered graphite.

9. An anti-friction bearing comprising, in combination, a rigid base member having a ring-shaped groove formed in one face, and a ring of lubricating material of tough coherent character lying loosely in said groove and capable of bodily rotation therein about the common axis of said groove and ring.

10. In an anti-friction bearing the combination of two relatively rotating members of rigid material having opposite and corresponding ring-shaped grooves in their opposing faces, and a ring of slightly compressible tough lubricating material located between said grooves and of a thickness sufficient to hold said grooved members slightly separated under any pressure not exceeding a predetermined amount.

FRED W. MÜLLER.